(12) United States Patent
Hesse et al.

(10) Patent No.: US 10,370,461 B2
(45) Date of Patent: Aug. 6, 2019

(54) REVERSE-PHASE POLYMERIZATION PROCESS

(71) Applicant: BASF SE, Ludwigshafen (DE)

(72) Inventors: Pascal Hesse, Mannheim (DE); Aleksandra Jelicic, Mannheim (DE); Gabriela Eugenia Fonseca Zepeda, Mannheim (DE); Robert Haschick, Mannheim (DE); Shankara Narayanan Keelapandal Ramamoorthy, Ludwigshafen (DE); Gareth Ian Naylor, Halifax (GB); John Scott Barratt, Mirfield (GB); Oliver Soetje, Mannheim (DE); Marcel Lievre, Ludwigshafen (DE); Florian Rainau, Frankenthal (DE); Mark Lebkuecher, Deidesheim (DE)

(73) Assignee: BASF SE, Ludwigshafen (DE)

( * ) Notice: Subject to any disclaimer, the term of this patent is extended or adjusted under 35 U.S.C. 154(b) by 608 days.

(21) Appl. No.: 14/908,872

(22) PCT Filed: Jul. 29, 2014

(86) PCT No.: PCT/EP2014/066252
§ 371 (c)(1),
(2) Date: Jan. 29, 2016

(87) PCT Pub. No.: WO2015/014825
PCT Pub. Date: Feb. 5, 2015

(65) Prior Publication Data
US 2016/0159939 A1    Jun. 9, 2016

(30) Foreign Application Priority Data
Jul. 31, 2013 (EP) .................................. 13178694

(51) Int. Cl.
*C08F 2/32*       (2006.01)
*C08F 220/56*   (2006.01)
(Continued)

(52) U.S. Cl.
CPC ................ *C08F 2/32* (2013.01); *B01J 19/10* (2013.01); *C08F 2/01* (2013.01); *C08F 220/56* (2013.01);
(Continued)

(58) Field of Classification Search
CPC .. C08F 2/01; C08F 2/32; C08F 220/56; B01L 19/10
(Continued)

(56) References Cited

U.S. PATENT DOCUMENTS 3,922,255 A    11/1975    Koestler et al.
4,444,961 A    4/1984    Timm
(Continued)

FOREIGN PATENT DOCUMENTS

CN    102378776 A    3/2012
DE    37 09 921 A1    10/1988
(Continued)

OTHER PUBLICATIONS

Lee, et al, "Biosynthesis of Acrylamide from Acrylonitrile in Aqueous Two Phase System," Biotechnology Letters, vol. 11, No. 1, 23-26 (1989). (Year: 1989).*
(Continued)

*Primary Examiner* — Fred M Teskin
(74) *Attorney, Agent, or Firm* — Oblon, McClelland, Maier & Neustadt, L.L.P.

(57) ABSTRACT

A reverse-phase suspension polymerization process for the manufacture of polymer beads comprising forming aqueous monomer beads comprising an aqueous solution of water-
(Continued)

soluble ethylenically unsaturated monomer or monomer blend and polymerizing the monomer or monomer blend, to form polymer beads while suspended in a non-aqueous liquid, and recovering polymer beads, in which the process comprises providing in a vessel (1) a volume (2) of non-aqueous liquid wherein the volume of non-aqueous liquid extends between at least one polymer bead discharge point (3) and at least one monomer feed point (4), feeding the aqueous monomer or monomer blend through orifices (5) into, or onto, the non-aqueous liquid to form aqueous monomer beads, allowing the aqueous monomer beads to flow towards the polymer bead discharge point initiating polymerization of the aqueous monomer beads to form polymerizing beads, wherein the polymerizing beads form polymer beads when they reach the polymer bead discharge point, removing a suspension of the polymer beads in non-aqueous liquid from the vessel at the polymer bead discharge point and recovering, water soluble or water swellable polymer beads from the suspension, in which the aqueous monomer or monomer blend and/or the orifices is/are vibrated such that the frequency multiplied by the weight average droplet diameter is between 150 and 800 mm/s. The invention also relates to the apparatus suitable for carrying out a reverse-phase suspension polymerization and polymer beads obtainable by the process or employing the apparatus. Furthermore, the invention also relates to polymer beads having a weight mean particle size in the range of 0.05 to 5 mm which are held in a container in an amount of at least 300 kg having a standard deviation of particle size less than 20%. In addition, the invention also provides polymer beads having a weight mean particle size in the range 0.05 to 5 mm having a standard deviation of particle size less than 20% and having an amount of residual acrylamide of less than 500 ppm.

17 Claims, 2 Drawing Sheets

(51) Int. Cl.
  *B01J 19/10* (2006.01)
  *C08F 2/01* (2006.01)
  *C08F 220/06* (2006.01)
  *C08F 220/20* (2006.01)
  *C08F 226/10* (2006.01)
  *C08F 220/38* (2006.01)
(52) U.S. Cl.
  CPC .... *B01J 2219/0888* (2013.01); *B01J 2219/24* (2013.01); *C08F 220/06* (2013.01); *C08F 220/20* (2013.01); *C08F 226/10* (2013.01); *C08F 2220/382* (2013.01); *C08F 2220/385* (2013.01)

(58) Field of Classification Search
  USPC .................................. 526/88, 909; 522/175
  See application file for complete search history.

(56) References Cited

U.S. PATENT DOCUMENTS

| 4,487,898 | A | 12/1984 | Kato et al. |
| 4,579,718 | A | 4/1986 | Vairetti et al. |
| 4,879,361 | A | 11/1989 | Rehmer et al. |
| 5,380,496 | A | 1/1995 | Hashiguchi et al. |
| 6,277,932 | B1 | 8/2001 | Whitley et al. |
| 2011/0294968 | A1 | 12/2011 | Abboud et al. |
| 2015/0038656 | A1 | 2/2015 | Abboud et al. |

FOREIGN PATENT DOCUMENTS

| EP | 0 051 210 A2 | 5/1982 |
| EP | 0 067 415 A1 | 12/1982 |
| EP | 0 271 922 A2 | 6/1988 |
| EP | 0 402 662 A2 | 12/1990 |
| EP | 0 952 989 | 11/1999 |
| JP | 51-150592 A2 | 12/1976 |
| JP | 2-305802 A | 12/1990 |
| JP | 5-194611 A | 8/1993 |
| JP | 2001-508099 A | 6/2001 |
| RU | 2 411 262 C2 | 2/2011 |
| WO | WO 98/30598 A1 | 7/1998 |
| WO | WO 02/49756 A1 | 6/2002 |
| WO | WO 03/066190 A1 | 8/2003 |
| WO | WO 2010/086433 A1 | 8/2010 |

OTHER PUBLICATIONS

Combined Chinese Office Action and Search Report dated Oct. 28, 2016 in Chinese Patent Application No. 201480054363.1 (with partial English language translation and English translation of category of cited documents).
Office Action dated Jan. 10, 2017 in Japanese Patent Application No. 2016-530488 (submitting English language translation only).
International Search Report and Written Opinion dated Oct. 9, 2014 in PCT/EP2014/066252.
Eli Ruckenstein, et al., "Sedimentation polymerization" Polym Er, vol. 36, No. 14, 1995, pp. 2857-2860.
Combined Office Action and Search Report dated Jul. 19, 2017 in Chinese Patent Application No. 201480054363.1 (with English language translation of the Office Action and English language translation of the categories of cited documents).
U.S. Appl. No. 14/908,925, filed Jan. 29, 2016, Robert Haschick, et al.
U.S. Appl. No. 14/908,823, filed Jan. 29, 2016, John Scott Barratt, et al.
Third Party Observation dated Dec. 2, 2015 in PCT/EP2014/066252.
Combined Russian Office Action and Search Report dated May 15, 2017 in Patent Application No. 2016106940 (with English language translation of categories of cited documents.

* cited by examiner

REVERSE-PHASE POLYMERIZATION PROCESS

The present invention relates to a process for the preparation of polymers by reverse-phase polymerisation. In particular the process involves the polymerisation of water-soluble ethylenically unsaturated monomers by a reverse-phase suspension polymerisation process to form polymeric beads.

It is known to manufacture water-soluble or water swellable polymer beads by reverse-phase polymerisation. Reverse-phase polymerisation processes comprise forming droplets of an aqueous solution of water-soluble ethylenically unsaturated monomer or monomer blend and polymerising the monomer or monomer blend, while the droplets are suspended in a non-aqueous liquid, to form aqueous polymer droplets. Where the monomer or monomer blend is formed into an emulsion or microemulsion in the continuous phase of non-aqueous liquid the resulting products would be reverse-phase emulsions or microemulsions of the polymer. In the case where the droplets of monomer or monomer blend are not emulsified into the non-aqueous liquid, the resulting polymer would be in the form of beads. Generally the droplet size of such beads would be larger than for emulsions or microemulsions. Typically such reverse-phase processes for making polymer beads are referred to as reverse-phase suspension polymerisation processes. If the droplets are beads, the polymerisation process is generally completed by drying the resultant polymer beads and separating the polymer beads from the non-aqueous liquid.

A variety of initiation systems have been employed in the manufacture of polymers. Frequently, the polymerisation of water-soluble monomer or monomer blends involves redox initiator systems or thermal initiator systems or combination of both. Redox initiator systems usually employ a redox couple which involves a chemical reducing agent and a chemical oxidising agent. Used in combination, radicals are formed which would combine with monomer molecules to initiate the polymerisation. Thermal initiators are compounds which start decaying at certain temperatures to generate radicals which in combination with monomer molecules will initiate the polymerisation.

The usual way of performing a reverse-phase suspension polymerisation process comprises charging a reaction vessel with non-aqueous liquid and dispersing the aqueous monomer or monomer blend in bulk into the non-aqueous liquid with sufficient agitation to form the aqueous monomer beads suspended in the non-aqueous liquid typically containing suitable stabilisers or protective colloids for the aqueous droplets. The resultant particle size distribution tends to be much narrower, and the amount of fines tends to be much less than when the polymer is made by the widely used gel polymerisation and comminution process and this is advantageous. However, the reverse-phase bead polymerisation process does have a tendency to produce beads having a wider net size distribution than would be desired including fines and some misshapen beads. This is due to the inevitable collisions and shearing forces applied to the monomer droplets and the polymerising beads, especially in large-scale commercial processes.

It is known to conduct oil in water emulsion and bead polymerisation processes, using water insoluble monomer or monomer blend dispersed in water, under conditions whereby collisions between the beads during polymerisation can be reduced.

In U.S. Pat. No. 3,922,255 a blend of water insoluble monomers is fed through orifices (to form non-aqueous beads) in the base of a vertical column along with an aqueous medium containing a stabiliser such as gelatin. This aqueous medium and the non-aqueous monomer beads strung together upwardly through the column and thereby form a dispersion of beads in water in the column. In an example, the time of travel through the column averages 3.5 min. The dispersion is taken from the top of this column through a line and fed to the top of a downwardly extending column heated to a temperature at which polymerisation is initiated.

In EP 67415, water insoluble monomer is fed through a droplet generator into an aqueous suspension medium containing a stabiliser so as to form a suspension of droplets in the aqueous medium. This suspension is then fed through a line to the top of a column where polymerisation is initiated and the aqueous medium flow downwardly at a rate such that the droplets initially reside at the top of the column but sink, co-current with the down flowing liquid, as polymerisation progresses.

Other disclosures of polymerising water insoluble monomer beads to produce narrowly distributed polymer beads include JP 51-150592, EP 271922 and U.S. Pat. No. 4,579,718.

In U.S. Pat. No. 4,444,961 a particular system is described for forming a dispersion of monomer beads in an immiscible liquid. This comprises a perforated plate separating a monomer supply from a vertical column of the immiscible liquid, and a vibrating pump for pulsing beads through the perforated plate into the column. In the preferred embodiments, the monomer is water insoluble monomer and the beads are pulsed into the base of an upwardly flowing column of water. However, it is also proposed that the beads could be counter current to the flow of the column. It is also proposed that a water-soluble monomer blend could be pumped as beads into a column of water immiscible liquid, in similar manner. The monomer droplets flow through this column and emerge from it as a dispersion in the immiscible liquid. The dispersion is then passed through a line into a separate vessel which is separate from the column in which the agitation is provided to maintain a dispersion of the droplets and polymerisation is initiated.

All of the aforementioned methods would result in improving the particle size distribution of beads formed by suspension polymerisation of a water-soluble monomer or monomer blend.

However, the stability of the non-polymerised droplets is not high enough to resist shear stress without undergoing changes in particle size distribution. For instance, in U.S. Pat. No. 4,444,961 the agitation after droplet formation during polymerisation will cause bead collisions, and in all the described processes, the transport of the beads in an immiscible liquid before they are exposed to polymerisation conditions will also result in undesirable bead collisions.

Ruckenstein and Hong in Polymer, volume 36, Number 14, pages 2857 to 2860 have described a method of making highly cross-linked beads by a manual method in a test-tube. In three runs this method gave beads having mean particle size of 1.3 to 2.5 mm and a relative standard deviation of 5 to 5.6%, but in a fourth run the starting monomer beads were formed more rapidly and then had a particle size of 0.46 mm and a relative standard deviation of 34%. Thus, the attempt to increase the rate of production is shown to result in very poor product quality.

In this small scale, slow, process for making cross-linked beads, beads of aqueous monomer including sufficient cross-linking agent are ejected onto the top of a 35 cm high column of non-aqueous liquid from a syringe which is shown as being positioned at a considerable height above the top of the column. The liquid in the column is heated to a temperature at which polymerisation will occur in the beads. The beads gradually sink through the column of heated liquid as they polymerise. Partial polymerisation had occurred by the time the beads reached the base of the column, and they were left in the base of the column for two hours in order to complete the polymerisation. Nevertheless, if an inadequate cross-linker had been used, it is believed that coalescence would have occurred. Therefore the process is not applicable to the more lightly cross-linked water swellable polymeric beads or non-cross-linked water-soluble polymeric beads of the type conventionally used. Further, accelerating the process is shown to give poor results and scaling up that process to be capable of commercial production would not be practicable in view of the inevitable collisions that would occur during the short fall down the column if large amounts of monomer are introduced and considering the apparent tendency for stickiness at the bottom of the column unless the beads are very highly cross-linked.

Another process is described in DE 3709921 for producing polymer beads with fairly narrow particle size distribution and in which undesirable coatings (fouling) are not formed on the polymerisation apparatus.

EP 952989 addressed many of the aforementioned disadvantages associated with bead polymerisation of a water-soluble monomer or monomer blend. A process of manufacturing polymer beads was disclosed in which an aqueous solution of water-soluble ethylenically unsaturated monomer or monomer blend in the presence of an initiator is extruded through orifices into a column of non-aqueous liquid as monomer beads. The column of non-aqueous liquid flows counter current to the descending aqueous monomer beads in order to slow their descent. Further, the non-aqueous liquid is at a temperature whereby polymerisation initiates substantially immediately upon contact between the beads and the non-aqueous liquid. This process achieved significant improvements over the aforementioned prior art processes. However, the process allows only a limited production rate and limited capacity to provide very large quantities of final product within an acceptable timescale. Further, this process tends to suffer the disadvantage of overheating especially as the reaction approaches completion with the consequence that the amount of monomer extruded into the non-aqueous liquid must be restricted to a lower level than may be desirable with the result that the amount of polymer beads that can be formed by this process may be less than desirable. However, it would be desirable to further improve upon this process. This is especially so in regard to modern commercial scale processes.

It would be desirable to provide a process which equals or improves upon the particle size distribution, in a process which enables greater production rates and the capacity to provide larger volumes of product. More preferably, it will be desirable to produce large volumes of polymer beads having a more consistent quality. In particular it would be desirable to provide polymer beads of high water solubility and high molecular weight especially polymer beads consistently having desired molecular weights.

According to the present invention we provide a reverse-phase suspension polymerisation process for the manufacture of polymer beads comprising forming aqueous monomer beads of an aqueous solution comprising water-soluble ethylenically unsaturated monomer or monomer blend and polymerising the monomer or monomer blend to form polymer beads while suspended in a non-aqueous liquid, and recovering polymer beads, in which the process comprises providing in a vessel (1) a volume (2) of non-aqueous liquid wherein the volume extends between at least one polymer bead discharge point (3) and at least one monomer feed point (4), feeding the aqueous monomer or monomer blend through orifices (5) into, or onto, the non-aqueous liquid to form aqueous monomer beads, allowing the aqueous monomer beads to flow towards the polymer bead discharge point, initiating polymerisation of the aqueous monomer beads to form polymerising beads, wherein the polymerising beads have formed polymer beads when they reach the polymer bead discharge point, removing a suspension of the polymer beads in non-aqueous liquid from the vessel at the polymer bead discharge point and recovering, water soluble or water swellable polymer beads from the suspension, in which the aqueous monomer or monomer blend and/or the orifices is/are vibrated such that the frequency multiplied by the weight average droplet diameter is between 150 and 800 mm/s.

The invention also concerns an apparatus suitable for a reverse-phase suspension polymerisation process for the manufacture of polymer beads from an aqueous solution comprising water-soluble ethylenically unsaturated monomer or monomer blend, in which the apparatus comprises a vessel (1) comprising a monomer feed point (4); a polymer bead discharge point (3), which vessel is suitable for containing a volume of non-aqueous liquid between the monomer feed point and the polymer bead discharge point, a multiplicity of orifices (5), suitable for the aqueous monomer or monomer blend to be fed through, a means for feeding the aqueous monomer or monomer blend through the orifices into, or onto, the non-aqueous liquid to form aqueous monomer beads, a means for removing a suspension of polymer beads in non-aqueous liquid at polymer bead discharge point, a means for recovering water-soluble or water swellable polymer beads from the suspension, a means for vibrating the aqueous monomer or monomer blend and/or the orifices such that the frequency multiplied by the weight average droplet diameter is between 150 and 800 mm/s.

By bead we mean a globular or otherwise round object. The beads may be substantially spherical or even elliptical. However, it is preferred that the beads are substantially spherical.

The polymer beads removed at the polymer bead discharge point may still be polymerising. However, said polymer beads should desirably be essentially non-coalescent by the time they reach the polymer bead discharge point. By non-coalescent we mean that the beads have a tendency not to stick together to form agglomerates. The polymer beads removed at the polymer bead discharge point may comprise mainly polymer, generally at least 80% polymer and typically at least 90% polymer the remainder of which is formed from monomer and/or other oligomeric or polymerisable species. In some cases the polymer beads removed at the polymer bead discharge point may be substantially fully polymerised with only low residual monomer, for instance less than 2% or below.

Typically the polymer beads removed at the polymer bead discharge point tend to be still polymerising. In this case it is preferred that the suspension of polymer beads removed at the polymer bead discharge point is subjected to a post polymerisation stage. Such a post polymerisation stage may be carried out in a separate vessel, optionally using additional initiator systems. Optionally the post polymerisation stage may involve irradiating the polymer beads with ultra-violet light or other radiation sources and/or subjecting the polymer beads to thermal energy.

The aqueous monomer beads are formed from an aqueous solution comprising water-soluble ethylenically unsaturated monomer or monomer blend. The aqueous solution may consist of dissolved monomer, water and optionally other ingredients such as polymerisation catalysts, for instance polymerisation initiators. Generally the aqueous solution of the monomer or blend of monomers may be at a concentration of up to 75% by weight of the monomer dissolved in water. Usually the concentration of the monomer or monomer blend in the aqueous solution will be less than this, for instance up to 60% or up to 55% or up to 50% by weight. Suitably the concentration of the monomer in the aqueous monomer or monomer blend should be at least 10%, typically at least 20% and usually at least 25% or at least 30%.

It may be desirable for the aqueous monomer or monomer blend to also contain at least one polymer which is suitably dissolved in it. Thus the aqueous monomer beads may comprise dissolved monomer or monomer blend in addition to at least one dissolved polymer. Suitably the at least one polymer is a solution of the same polymer type as the polymer formed in the present process. For instance if the aqueous monomer comprises acrylamide with other comonomers the at least one polymer may be a polymer of acrylamide with the same other comonomers. Alternatively the at least one polymer should be compatible with the aqueous monomer or monomer blend. Suitably the amount of polymer present in the aqueous monomer or monomer blend may be up to 120% of the dry weight of monomer or monomer blend. Typically, where at least one polymer is present the amount will be less than this, for instance up to 100% of the dry weight of the monomer or monomer blend and usually no more than 80%, desirably no more than 60%. Where the at least one polymer is present in the aqueous monomer or monomer blend it may be in an amount which is quite small, for instance at least 0.05% and suitably at least 0.1%, often at least 0.5%, for instance at least 1.0%. The amount of at least one polymer contained in the aqueous monomer or monomer blend may depend upon the desired properties and also the molar mass of the at least one polymer. It may be desirable to employ at least one polymer in the monomer or monomer blend so as to alter the rheological properties of the aqueous monomer or monomer blend and hence the rheological properties of the aqueous monomer beads. In some cases the presence of the at least one polymer may viscosify the aqueous monomer or monomer blend which may reduce the ability of the aqueous monomer beads to deform and/or coalesce. Preferably, however, the aqueous monomer or monomer blend which is fed or extruded and the so formed aqueous monomer beads do not contain polymer.

In a preferred process of the invention the polymer which is obtained is water-soluble. Generally this is made by conducting the polymerisation in the absence of added cross-linker. Accordingly, the process is particularly valuable for the manufacture of polymeric flocculants and viscosifiers.

In other processes the beads can be swellable in water rather than water-soluble. For instance the beads can be cross-linked by polymerising the monomer or monomer blend in the presence of added cross-linking agent. The amount of cross-linking agent can be selected between the values which are relatively low and values which are high. For instance the amount of cross-linking agent can be 100 to 500 ppm up to 1000 to 2000 ppm or more based on weight of cross-linking agent on weight of monomer.

However, in some cases it may be desirable to produce water-soluble polymers by the inclusion of small amounts of added cross-linking agent, for instance up to 10 ppm of cross-linking agent based on total polymer, such as up to 8 ppm, or up to 6 ppm or up to 5 ppm; this may be at least 0.1 ppm or at least 0.5 ppm or at least 1 ppm or at least 2 ppm.

The cross-linking agent may be a compound which reacts with pendant groups of monomer units or polymer chain, for instance multi valent metal salts where the monomer or polymer carry a carboxylic acid group. Preferably the cross-linking agent may be a polyethylenically unsaturated compound i.e. a compound with at least two ethylenically unsaturated moieties. Suitably the cross-linking agent may be methylenebisacrylamide, tetra allyl ammonium chloride, polyethylene glycol diacrylate etc.

Desirably the aqueous monomer or monomer blend may be degassed in order to remove oxygen which may otherwise inhibit the polymerisation reaction. In general, this should be done prior to feeding the aqueous monomer or monomer blend through the orifices.

Suitably the degassing of the aqueous monomer or monomer blend may be achieved by mixing it with nitrogen in a mixer. Subsequently the mixture of the aqueous monomer or monomer blend and nitrogen may be flowed into a degassing column. Specifically a thin film of the aqueous mixture can be formed on the walls of the degassing column, from which the nitrogen and any entrained oxygen can be released into the offgas and/or monomer or monomer blend. Suitably the degassing column walls may be constructed of glass or at least have a glass lining. The degree of deoxygenation can be monitored by detecting the amount of oxygen in the offgas using an oxygen sensor. The amount of nitrogen mixed in the aforementioned mixture can then be adjusted as appropriate. The degassing may be carried out according to the teachings of WO 03/066190.

By feeding the aqueous monomer or monomer blend through the orifices this may also be regarded as extruding. Such an extrusion of the monomer may tend to form a stream of monomer liquid and/or monomer beads. Where a stream of monomer is formed the stream may then break into individual monomer beads In the invention, the aqueous monomer or monomer blend is fed into or onto the non-aqueous liquid. The aqueous monomer or monomer blend should be fed or extruded such that individual monomer beads having a desired size are formed. Where the aqueous monomer or monomer blend is fed or extruded onto the non-aqueous liquid desirably this should be done not shatteringly onto the non-aqueous liquid. By this we mean that the monomer bead does not break upon contact with the non-aqueous liquid.

The aqueous monomer beads flow towards the polymer bead discharge point. The direction of flow should be in an upwards direction when the polymer bead discharge point is above the monomer feed point. When the direction of flow is upwards desirably the density of the monomer beads should be lower than the density of the non-aqueous liquid. Further, in this case it would be generally desirable for the direction of flow of the non-aqueous liquid to be upwards. The ascending aqueous monomer beads suitably may be initiated by subjecting to polymerisetion conditions in order to induce polymerisation. The direction of flow should be in a downwards direction when the polymer bead discharge point is below the monomer feed point. It is preferred that the direction of flow is downwards.

When the direction of flow is in a downwards direction the aqueous monomer beads should desirably fall gradually and independently through the non-aqueous liquid. The descending aqueous monomer beads suitably may be initiated by subjecting to polymerisation conditions in order to induce polymerisation.

The non-aqueous liquid may be flowing in an upward direction or alternatively in a downward direction or in some cases it may be desirable for the non-aqueous liquid to be substantially non-flowing. When the non-aqueous liquid is substantially non-flowing suitably it may be essentially stationary and non-agitated. Desirably any movement of the non-aqueous liquid should be substantially non-disruptive to the monomer beads or the polymerising beads.

Thus when the non-aqueous liquid is flowing either in an upward direction or in a downward direction desirably it should be substantially non-disruptive. By this we mean that the flow of non-aqueous liquid does not disrupt the individual integrity of the monomer beads which are descending through the column of non-aqueous liquid. Therefore the flow should be sufficiently non-turbulent that it does not cause unacceptable collisions of the monomer beads or polymerising beads especially while they are sticky and falling through the column of non-aqueous liquid. The flow should be sufficiently non-disruptive in size that it does not cause shearing of the beads into small particles while they are flowing down through the volume of non-aqueous liquid. Conveniently therefore the flow can be considered to be substantially non-turbulent. In some cases it may be desirable that the flow is sufficiently non-turbulent that it is substantially laminar flow. However, there can still be a small amount of non-laminar flow within the non-aqueous liquid due to convection effects with the consequential formation of swirls or eddies. Generally these can be tolerated provided that the collisions between the aqueous monomer beads and/or polymerising beads are avoided or within an acceptable level. In general the beads which are flowing through the non-aqueous liquid will follow a substantially rectilinear downward or upward path and will not encounter forces having a sufficient transverse component as to promote significant coalescence of the beads as they flow.

The volume of non-aqueous liquid may be formed in any suitable vessel. Suitably the volume of non-aqueous liquid may be in the form of a column which extends between the polymer bead discharge point and the monomer feed point. Typically the volume or column of non-aqueous liquid may have a cross-sectional diameter which is less than the height. Nevertheless, it may be desirable in some instances for the cross-sectional diameter to be the same or greater than the height.

Suitably the non-aqueous liquid may be admitted to the vessel by any suitable means, for instance an inlet port.

In general the volume or column of non-aqueous liquid is usually wholly vertical but it can be slightly inclined provided the flow profile is such that the beads do not significantly impact on to and coalesce against the walls of the vessel.

The column may be formed in any suitable upright vessel which may for instance be a tubular substantially vertical reaction vessel. The vessel should be free of baffles or other turbulence introducing features. Preferably the walls of the vessel are substantially smooth and parallel or taper outwardly or inwardly at an angle which is sufficiently low to avoid promoting turbulence.

The flow rate of the non-aqueous liquid, whether in a upwards direction or a downwards direction, may be adjusted in such a way to control the rate of descent of the beads to a period which is within the range of about 0.5 or 1 min to about 30 min and which is sufficient (having regard to the initiator and other polymerisation conditions) for the beads to be substantially non-coalescent when they reach the base of the column. By non-coalescent we mean that the beads have a tendency not to stick together to form agglomerates.

When the polymerising beads are descending the rate of flow may be such that the duration of the descent of beads is at least about 0.5 min, and usually at least 1 min. In general, depending upon the rate of polymerisation, this may be required to ensure that sufficient time is given for the polymerisation to proceed sufficiently, before the beads reach the base of the vessel, or the beads to be substantially non-coalescent by the time they reach the base of the vessel. Furthermore it may be desirable to conduct the process using a polymerisation which takes a significant time to go to completion, rather than a polymerisation which achieves near completion, within a few seconds. This is because, as a generality, improved polymer properties tend to be obtained with slower polymerisations than with quicker polymerisations, especially when making high molecular weight water-soluble polymers or other useful polymers in accordance with this invention. In general, if the duration of fall is, for instance significantly less than about 0.5 min then it is likely that either significant coalescence may occur at the base of the column or that the polymerisation may have to be arranged to progress so rapidly as to risk producing an inferior polymer, or both.

The size of the polymer beads which are ultimately formed will be determined generally as a result of the choice of monomer extrusion conditions (for instance the size of the orifices). In addition the polymer bead size may be influenced by how the monomer beads are introduced into the non-aqueous liquid. Preferably the avoidance of shattering of the beads into or closely onto the non-aqueous liquid may avoid undesirable variations to the particle size. Further, it is preferred that where the non-aqueous liquid is flowing either upwards or downwards that the flow is substantially non-turbulent which may risk undesirable collisions and/or coalescence of the monomer beads or polymerising beads.

The size of the aqueous monomer beads is selected so as to provide final polymer beads of whatever size is desired, for instance having a weight average size in the range 30 μm to 3 mm, and often between 0.1 mm and 2 mm. Usually all the orifices are substantially the same size and usually all discharged from the single supply chamber and discharge under substantially the same pressure. In some cases, particularly where a relatively large number of orifices are employed, it may be desirable to use multiple supply chambers. Alternatively a single supply chamber may be employed which has several inlets into it. Generally the discharge pressure should be substantially the same for all of the orifices even where multiple supply chambers are employed. Accordingly the initial aqueous monomer beads are preferably all substantially the same size. In general, the aqueous monomer beads are usually as uniform in size as possible, for instance at least 90% by weight within 15 to 30% of the weight average size. Often the size distribution is significantly less than this, for instance as discussed in more detail below.

It is generally preferred that the extrusion orifices are located at the surface or beneath the surface of the non-aqueous liquid, i.e., so that the monomer beads are fed or extruded directly from the orifices into the non-aqueous liquid. Feeding or extrusion from orifices above the non-aqueous liquid can, however, be tolerated provided the drop distance is sufficiently small that the beads of monomer do not shatter or otherwise significantly distort when they impact on the surface of the non-aqueous liquid. Typically, the orifices should not be located more than 20 mm, and preferably not more than 10 mm, above the surface of the non-aqueous liquid. Nevertheless, in some instances it may be desirable for the orifices to be located more than 20 mm above the surface of the non-aqueous liquid.

Preferably the aqueous monomer or monomer blend is fed or extruded into the non-aqueous liquid. The individual monomer beads may not necessarily form immediately as the fed or extruded monomer enters the non-aqueous liquid. Instead a multiplicity of streams of fed or extruded monomer may initially enter the non-aqueous liquid from a multiplicity of orifices and then subsequently break into the individual monomer beads. In some cases the monomer beads may form as the fed or extruded monomer exits at least some of the orifices. In certain cases the monomer beads may form as the fed or extruded monomer exits substantially all of the orifices. Suitably, however, a multiplicity of streams of fed or extruded monomer may enter the non-aqueous liquid from substantially all of the orifices, for instance at least 95%, particularly at least 99% and usually 100% of the orifices, and then subsequently the fed or extruded streams of monomer breakup into individual monomer beads.

In the preferred process where the direction of flow of the monomer beads is downwards the monomer beads are introduced into the column of non-aqueous liquid at the monomer feed point which is at or near the top of the column. Non-aqueous liquid may be above the monomer feed point, for instance as a result of a monomer bead extrusion device being provided in the centre of the upright vessel and non-aqueous liquid being located around it. Often, however, the monomer feed point is at the top of the column in that when the non-aqueous liquid is not flowing the top of the column is the highest point of the non-aqueous liquid or when the non-aqueous liquid is upflowing this is the point at which the non-aqueous liquid is deflected from a substantially vertical flow to a horizontal flow or other direction which allows it to be removed from the vessel or when the non-aqueous liquid is down flowing this is the point at which the non-aqueous liquid flows from a horizontal or other direction and then starts to flow substantially vertically downwards which in general allows the non-aqueous liquid to enter the vessel. In many situations the monomer feed point may represent the highest point of the column of non-aqueous liquid in the vessel and generally this may be irrespective of whether the non-aqueous liquid is flowing or substantially non-flowing.

The discharge of the aqueous monomer beads into or onto the non-aqueous liquid may be at this monomer feed point or it may be at some position distant from it provided that position is above and is in sufficiently close and substantially non-disruptive non-aqueous liquid communication with the monomer feed point. Thus the monomer feed point may be a point at which the column of non-aqueous liquid is deflected laterally when flowing upwards or flows from a lateral direction and then deflected substantially vertically when flowing downwards and in both instances there can be a short vertical column above this in which little or no up flow or down flowing occurs but down which the beads can fall through non-aqueous liquid in a sufficiently or substantially non-turbulent manner without coalescence.

More preferably the non-aqueous liquid flows in a downwards direction i.e. co-current with the direction of flow of the monomer beads. This has been found to be particularly advantageous when the aqueous monomer or monomer blend is fed or extruded into the non-aqueous liquid.

A further significant factor in the invention is the control of the feeding or extrusion, monomer bead generation and stability of the so formed monomer beads. The inventors of the present invention have found that by vibrating the aqueous monomer or monomer blend and/or the orifices such that the frequency multiplied by the weight average droplet diameter is between 150 and 800 mm/seconds a steady stream of monomer or monomer beads from each orifice results. By vibration we mean that the aqueous monomer or monomer blend and/or the orifices are subjected to oscillations which occurred about an equilibrium point. The term vibration may also be regarded as any means by which the relative velocity of the aqueous monomer or monomer blend as it flows through the orifices is accelerated and then decelerated repeatedly. Where a stream of monomer is produced this stream will subsequently break in to monomer beads. The monomer beads have a reduced tendency to collide. Further, the process allows for a significantly higher concentration of monomer beads to be generated simultaneously without any significant risk of undesirable coalescence. Preferably the frequency multiplied by the weight average droplet diameter is between 250 and 500 mm/s. Preferably, the vibration amplitude is between 0.0005 and 0.005 mm.

The vibration frequency may be in the range of 100 to 2000 Hz. Suitably the vibration frequency should be in the range of from 300 or still more suitably from 450 to 800 Hz. Preferably, the vibration frequency should be in the range from 500 to 750 Hz.

Unexpectedly the inventors found that the process of the present invention can be controlled effectively without risking any significant coalescence of the monomer beads or polymerising beads.

Desirably the vibrations can be generated using a piezoelectric device. Suitably such a piezoelectric device may be a piezoelectric transducer capable of converting electrical impulses into vibrations with the appropriate frequency. In fact the vibrations may be produced employing any piezoelectric material (including any material which possesses piezoelectric properties), provided of course the vibrations are within the correct frequency range. Such piezoelectric devices, which include piezoelectric transducers and piezoelectric materials, are well documented in the literature. Alternatively, the vibrations can be induced by other e.g. mechanical devices.

The extrusion of the aqueous monomer or monomer blend as monomer beads through orifices may be conducted in any suitable manner for forming a plurality of beads of predetermined size from a fluid liquid. There may be a plurality of extrusion needles each of which is provided with a pulsed supply of the aqueous monomer or monomer blend or then maybe a perforated grid provided with a pulsed supply of the aqueous monomer or monomer blend. Suitably, the orifices may be a plurality of perforations in a plate. The pulsed aqueous monomer or monomer blend may be provided by vibrating it using a suitable mechanical means that vibrates the aqueous monomer or monomer blend at the aforementioned vibration frequency multiplied by the weight average droplet diameter. Such a suitable mechanical means may include a vibrating diaphragm in the monomer supply chamber or chambers. Where the orifices are vibrating this may be achieved by moving a plate, in which the orifices are located, upwards and downwards repeatedly thereby achieving the effect of accelerating and decelerating the relative velocity of the aqueous monomer or monomer blend. Where the aqueous monomer or monomer blend is vibrated this could be achieved by compression and decompression repeatedly; pushing and pulling of the aqueous monomer or monomer blend repeatedly, for instance in a membrane chamber or employing a piezoelectric device as the aqueous monomer or monomer blend is being conveyed to the orifices.

Desirably the orifices are disposed in at least one plate or at least one grid. Therefore the process may employ a multiplicity of orifice containing plates and/or orifice containing grids. Preferably one plate or one grid is employed. More preferably a single plate is employed in which a plurality of orifices is disposed.

Preferably the orifices comprise a conical part and a cylindrical part. Suitably the conical part and cylindrical part should be in communication with each other. Typically such orifices may be referred to as having a conical-cylindrical shape. This preferred form of orifice is represented diagrammatically in FIG. 3. Where the conical-cylindrical orifices are disposed in a plate it is usual for the conical part of the orifice to open into the plate from the upper side with the widest diameter of the conical part of orifice at the opening on the other side of the plate. The sides of the conical part of the orifice should then taper inwardly until the conical part meets the cylindrical part of the orifice. The sides of the cylindrical part of the orifice should have a constant diameter opening at the lower side of the plate. Thus the conical part of the orifice desirably takes the form of an inverted cone or inverted truncated cone. The conical part of the orifice should open into the cylindrical part of the orifice. Thus the conical part of the orifice is typically an inverted cone truncated at the point where it is in communication with the cylindrical part of the orifice. Such a truncated cone may be regarded as being frusto conical and therefore the term conical part used in accordance with the present invention means both conical and frusto conical. Preferably the cylindrical part of the orifice should be perpendicular to the plate i.e. the axis of the cylindrical part of the orifice should be substantially 90° to the plate, although small variations of for instance up to about 5° may be tolerated. Preferably the conical part of the orifice should also have an axis which is substantially perpendicular to the plate i.e. substantially 90° (e.g. plus or minus up to about 5° variation).

Suitably, where the orifices comprise a conical part and a cylindrical part, the aqueous monomer or monomer blend should preferably flow through the conical part first and then through the cylindrical part.

Typically the orifices are contained in a grid or preferably a plate which is part of a droplet generation head. Suitably the droplet generation head will comprise an orifice containing plate or orifice containing grid and a chamber suitable for containing the aqueous monomer or monomer blend. Aqueous monomer or monomer blend is pumped or otherwise fed to the chamber wherein the aqueous monomer or monomer blend collects before it passes through the orifice containing plate or orifice containing grid.

The droplet generation head may be so adapted as to deliver a pulsated flow of aqueous monomer or monomer blend. The frequency of the pulsations may be between 20 and 1000 Hz, for instance from 100 to 800 Hz. Therefore the flow of monomer through the orifices may be subject to pulsed variations in pressure. For instance, part of the chamber may be separated by a diaphragm which is caused to vibrate at the desired frequency, for instance by means of electromagnetic vibration or using a piezoelectric device. However, preferably the droplet generation head is so adapted as to deliver a constant flow of aqueous monomer or monomer blend i.e. not subject to a pulsated flow or pressure variations.

Preferably the chamber of the droplet generation head acts as a reservoir to enable a constant flow of the aqueous monomer or monomer blend to pass through all of the orifices contained in the plate or grid at a substantially constant pressure. The inner chamber also reduces or eliminates any pressure variations resulting from pumping or otherwise feeding of the monomer.

Thus the inner chamber has a dampening effect on the pressure fluctuations of monomer being delivered to the orifices.

In a more preferred form of the invention the droplet generation head is submersed in the non-aqueous liquid. More preferably still the flow of the non-aqueous liquid is downwards and co-current with the flow of monomer beads. Typically the monomer flows into the droplet generation head where it is held in the inner chamber before being fed or extruded through a multiplicity of orifices, which are preferably of a conical-cylindrical shape, of a plate contained in the droplet generation head. It is also preferred that the monomer is fed or extruded into the preferably downwardly flowing non-aqueous liquid from the orifice containing plate forms a multiplicity of fed or extruded monomer beads or fed or extruded monomer streams which become monomer beads. Where the monomer is fed or extruded as monomer streams the streams remain intact for a short distance before dividing into regular streams of descending monomer beads. The distance before the monomer streams divided into monomer beads is not particularly important. However, this is usually between 0.5 and 20 mm.

Suitably the whole orifice containing plate or whole orifice containing grid is vibrated in accordance with the present invention. Where the orifices are held in a plate which is part of a droplet generation head, the plate may be caused to vibrate or preferably the whole droplet generation head containing the plate may be caused to vibrate.

The orifices generally have a diameter in the range 0.05 to 2 mm, more preferably in the range 0.1 to 1.5 mm. Where the orifices have a conical-cylindrical shape these dimensions should refer to the cylindrical part. Desirably the smallest diameter of the conical part should correspond to that of the cylindrical part of the orifice. The angle of the inner wall of the conical part should be greater than 0° and up to 60°, for instance between 20° and 50°.

The process may be facilitated by the presence of suitable stabilisers or protective colloids which may help to prevent coalescence of the monomer beads or polymerising beads. The stabilisers or protective colloids may be surfactants or polymeric materials conventionally used for making polymer beads by reverse-phase suspension polymerisation. Preferably the process is facilitated by the presence of amphipathic polymeric stabiliser in the non-aqueous liquid. The amount can be less than the amount which is normally required for a conventional suspension polymerisation and the amount of active polymeric stabiliser may generally at least 0.01% based on the weight of non-aqueous liquid, for instance at least 0.05% or at least 0.1% and in some cases at least 0.3% or at least 0.5% or at least 1.0%. The amount of active polymeric stabiliser may be as much as 10% based on the weight of non-aqueous liquid, for instance up to 5.0% or up to 2.0%. In some cases it may be up to 1.0% or up to 0.5%. Suitable polymeric stabilisers are copolymers of water-soluble ethylenically unsaturated monomers, such as methacrylic or acrylic acid or dialkyl amino alkyl (meth) acrylate salt, and water insoluble ethylenically unsaturated monomers such as styrene and/or fatty alkyl acrylates or methacrylates. Block copolymers (including multiblock copolymers, such as diblock or triblock copolymers) such as the copolymer of polyethylene glycol and hydroxy stearic acid can be used, all as is conventional for reverse-phase suspension polymerisation of water-soluble monomers to provide polymer beads of water-soluble or water swellable polymers.

The non-aqueous liquid can be any conventional hydrocarbon or other non-aqueous liquid such as any of those known for use in reverse phase polymerisations. For instance, it may be an aliphatic, cycloaliphatic or aromatic hydrocarbon, typically having a boiling point of between 140° C. and 350° C. Suitable non-aqueous liquids include D40, D80, D100, Isopar G, or Isopar H by companies such as Exxon Mobil, Shell Chemicals or others. When the process employs a photo polymerisation technique the non-aqueous liquid should be chosen so as to allow the passage of the appropriate wavelengths of radiation chosen for polymerisation.

The time required for the monomer beads to polymerise sufficiently that they become non-coalescent, while still dispersed in the non-aqueous liquid, is dictated by the choice of the monomer or blend of monomers, the initiator system and the polymerisation conditions in the vessel, such as the choice of initiators, temperature, and, in the case of photo polymerisation, the wave length of the light such as ultraviolet light and the intensity.

The rate of descent or assent of the beads (i.e. as monomer beads and polymerising beads), and thus their times of travel, depends on the size and composition of the beads, the rate and direction of flow, and the choice of flowing liquid for instance, viscosity and especially the differential between the specific gravities of the beads and the liquid. Viscosifier can be included to increase the viscosity of the non-aqueous liquid but this is usually avoided.

As to whether or not the column of non-aqueous liquid is substantially static or flowing and if so the rate of upward flow or downward flow will depend upon the relative specific gravities of the aqueous monomer beads and the polymerisation conditions and desirably should be selected in a known manner such that the monomer beads polymerise to a substantially non-coalescent state before they reach the bottom of the column. As already stated it is preferred that the column of non-aqueous liquid flows in a downward direction i.e. co-current with the direction of flow of the beads.

Preferably the period of time for the monomer beads to reach the bottom of the column as non-coalescent polymer beads should be not more than 30 min and preferably not more than 20 min and is usually not more than 10 min. Preferably the period is at least 10 seconds and often at least 30 seconds and usually may be within the range of between 1 or 2 min and 5 or 10 min. In many cases it may be considered undesirable to polymerise too quickly, since this may impact on the final molecular weight of the polymer beads. Therefore it is normally preferred to polymerise for at least 10 seconds before the polymer beads become non-coalescent and frequently the polymerisation may need to be conducted for at least 20 seconds or 30 seconds before the non-coalescent state is achieved.

It may be desirable that there is a substantially static column of non-aqueous liquid down through which the beads fall before reaching a column of flowing non-aqueous liquid. This static column of non-aqueous liquid may occupy a few seconds, for instance up to 10 or even 20 seconds or more in some processes, and so this will add to the total polymerisation time. Preferably however, such a static column of non-aqueous liquid is not employed.

The rate of flow (upward flow or downward flow) of the non-aqueous liquid through the vessel is usually at least 0.2 cm/sec and preferably at least 0.4 cm/sec. Suitably, it is not more than 3 cm/sec but speeds of up to 10 cm/sec or higher may be achievable in some processes. Preferably the flow rate is not more than 2 cm/sec, more preferably not more than 1.5 cm/sec, for instance below 1 cm/sec. The respective rates of flow correspond to at least the main part of the vessel, for instance at least 90% of the vessel. Often as the non-aqueous liquid containing the dispersed polymer beads approaches the polymer bead discharge point the vessel narrows with the result that the flow rate inherently increases. Sometimes this increased flow rate may be at least twice and in some cases at least five times the flow rate in the main part of the vessel. A particular advantage of the invention is that it is easily possible to adjust the speed of flow, for instance merely by adjusting the rate of pumping of the non-aqueous fluid through the apparatus, and where necessary adjusting the rate of flow of the aqueous monomer or monomer blend through the orifices. When adjusting the speed of flow it is usually necessary to adjust the respective rates of flow for the non-aqueous liquid and monomer in order to maintain a desired concentration of polymer beads dispersed in the non-aqueous liquid. Therefore it is easily possible to change the rate of descent or assent of the monomer beads and polymerising beads subject to the desired polymerisation conditions, such as variations in the feed (for instance changes in the monomer or monomer blend or in the initiator or temperature) or rate of supply of monomer feed or desired end product (for instance molecular weight).

It may be desirable that the rate of flow at the top of the column (and down through which the monomer droplets fall) should be less than the rate of flow throughout the main length of the column. This can be especially the case when the column of non-aqueous liquid is flowing upwards. Thus there can be a static head of fluid at the top of the column or, more usually, the rate of flow in the topmost section of the column is less than 90% and often less than 70% of the rate of flow throughout the central part of the column. Usually it is at least 20% of the rate of flow through the central part of the column, for instance above 40%. When the column of non-aqueous liquid is flowing upwards one reason for having a static or slower flow at the top of the column is that the monomer droplets tend to have a lower specific gravity than the droplets once polymerisation has progressed significantly. In this case by arranging for the flow to be less at the top, sedimentation of the beads occurs at the top of the column even though the rate of upflow lower down the column (selected to give the desired sedimentation of the polymerising beads) is sufficiently high that it would (if applied to the monomer beads) be liable to carry the monomer beads upwardly and out of the column.

In some situations it may be desirable that the rate of flow at the top of the column (and through which the monomer droplets fall) should be greater than the rate of flow throughout the main length of the column. This can be especially the case when the column of non-aqueous liquid is flowing downwards. Thus the rate of flow throughout the central part of the column can be less than 90% and sometimes less than 70% of the rate of flow throughout the topmost section of the column. Often it is at least 20% of the rate through the topmost section, for instance above 40%. When the column of non-aqueous liquid is flowing downwards a reason for having a greater flow at the top of the column is in view of the tendency for monomer droplets to have a lower specific gravity than the droplets once polymerisation has progressed significantly.

The top part of the vessel should desirably be designed in a way that, especially when the monomer is injected into the non-aqueous liquid, swirls and convection effects causing droplet collisions with other droplets or the droplet generator are minimized. This is usually done by a wider top part of the column.

The process of the present invention may employ any of the conventional polymerisation techniques, such as redox initiated polymerisation, photo polymerisation or thermal polymerisation or combination of two or more initiation techniques. For instance, it may be desirable to employ a combination of redox initiation and photo initiation, for instance UV initiation or for instance either redox initiation and/or photo initiation in combination with thermal initiation.

It may be desirable for the process to employ a thermal polymerisation technique. Such thermal polymerisation techniques and suitable initiators are well documented in the literature. Typically the initiators suitable for thermal polymerisation start to decay and form radicals at a given temperature. Suitable initiators include azo compounds, such as those mentioned below. However, thermal polymerisation techniques often require that the temperature of initiation is at least 40 or 50° C. or more.

Therefore polymerisation techniques which enable the polymerisation to be started at much lower temperatures are preferred.

Any suitable initiator can be used. The initiator can be, for example, a peroxide, a persulfate, an azo compound, a redox couple or mixtures thereof.

Examples of peroxides are hydrogen peroxide, potassium peroxide, di-tert-butyl peroxide, tert-butyl hydroperoxide, cumene hydroperoxide and di-benzoyl peroxide. Examples of persulfates are ammonium, sodium or potassium persulfate. Examples of azo compounds are 2,2-azobisisobutyronitrile, 4,4'-azobis(4-cyanovaleric acid) and 2,2'-azobis(N,N'-dimethyleneisobutyramidine)dihydrochloride, 1,1'-azobis(cyclohexanecarbonitrile) and 2,2'-azobis(2-amidinopropane)dihydrochloride. Examples of sulfates are ferrous ammonium sulfate. Redox couples consist of an oxidizing agent and a reducing agent. The oxidizing agent can be one of the above listed peroxides, persulfates, permanganate or azo compounds, or an alkali metal chlorate or bromate. Examples of alkali metals are given above. Examples of reducing agents are ascorbic acid, glucose or ammonium or alkali metal hydrogen sulfite, sulfite, thiosulfate or sulfide, or ferrous ammonium sulfate.

Suitably, the initiator may be a mixture of a redox couple with one or more initiators selected from the group consisting of peroxides, persulfates and azo compounds.

More suitably, the initiator may be a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more suitably, the initiator may be a mixture of a redox couple, wherein the oxidizing agent is selected from the group consisting of hydrogen peroxides and alkali metal bromates, and the reducing agent is an alkali metal hydrogen sulfite or sulfite, with one or more azo compound initiators.

Desirably, the initiator is a mixture of a redox couple, wherein the oxidizing agent is selected from the group consisting of tert-butylhydroperoxide and potassium bromate, and the reducing agent is sodium sulfite, with one or more azo compound initiators selected from the group consisting of 2,2-azobisisobutyronitrile, 4,4'-azobis(4-cyanovaleric acid), 2,2'-azobis(2-amidinopropane)dihydrochloride and 2,2'-azobis(N,N'-dimethyleneisobutyramidine).

A preferred polymerisation technique employs electromagnetic radiation or actinic radiation in combination with suitable photo initiators. More preferably the polymerisation technique employs ultraviolet radiation in combination with suitable UV photo initiators. The ultraviolet light source maybe any conventional ultraviolet light source conventionally used in UV polymerisation techniques. A preferred ultraviolet light source is a light source comprising a light emitting diode (LED), for instance an LED array.

Preferably, the wall or walls of the vessel comprise a transparent portion and the light source comprising the UV light source is mounted externally such that UV radiation from the light source penetrates the vessel. Suitably light source may be in communication with an external surface of a transparent portion of the vessel. Preferably the light source is mounted at a distance of up to 10 cm from the external transparent surface of the vessel, more preferably within a range of 0.1 and 5.0 cm. The transparent portion of the vessel may be formed from a suitable material which is substantially transparent to UV light. For instance, this material may be glass or plastic. Suitable glass materials include quartz glass and borosilicate glass. More preferably still the vessel comprises a wall or walls which comprise borosilicate glass. Alternatively, the UV light source maybe mounted inside the reactor vessel.

Preferably, the UV radiation is UVA radiation, particularly with a frequency of 340 to 380 nm, for instance between 360 and 370 nm.

The intensity of the actinic radiation, for instance UV light, may be in the range of 5 to 1000 $mW/cm^2$, desirably 10 to 1000 $mW/cm^2$, for instance within the range of 30 to 100 $mW/cm^2$.

The vessel in which the process is conducted may be any convenient shape and size which allows the monomer beads to descend through the non-aqueous liquid such that suitably non-coalescent polymer beads are formed. It may be desirable for the vessel to have flat wall or walls and for instance comprise a horizontal cross-section which is triangular, square, rectangular, or other polygonal shape such as pentagonal, hexagonal, heptagonal or octagonal etc. Alternatively, it may be desirable for the vessel to have curved wall or walls and for instance comprise a horizontal cross-section which is circular, elliptical or oval etc.

It may also be desirable for the vessel to comprise a further wall or set of walls within the boundary defined by a first wall or walls. Thus the vessel may comprise an outer wall or walls and an inner wall or walls and the non-aqueous liquid is contained in the space between the outer wall or walls and the inner wall or walls. Preferably the vessel comprises an outer circular wall or walls and an inner circular wall or walls and in which the horizontal cross-section defines two concentric circles with an annular gap between the inner wall or walls and the outer wall or walls. In this preferred form of the process the non-aqueous liquid is contained in the annular gap which is defined by the inner wall or walls and the outer wall or walls. In one form of this preferred aspect of the invention the UV source is located external to of the outer wall. In a further form the UV source is located external to the inner wall. In both scenarios the UV source would be located external to the reaction medium. It may also be desirable for the UV source to be located external to both the inner wall and outer wall. Thus the vessel may comprise an LED light source or other UV light source in communication with the external surface of the outer wall or walls and/or inner wall or walls of the vessel. More preferably at least one LED array is mounted externally to the inner wall or walls and/or outer wall or walls.

The vessel may be of any suitable dimensions. Typically the vessel may have a height of up to 25 m or more but is usually no more than 20 m, for instance up to 15 m for up to 10 m. Suitably the vessel may have a height of at least 2 m and usually more, for instance at least 3 m or at least 5 m. Suitably the cross-section of the vessel may be up to 5 m or more but is usually no more than 3 m in diameter. Usually the cross-section of the vessel should be at least 0.25 m and often may be at least 0.5 m, for instance at least 1.0 m or at least 1.5 m. Where the cross-sectional diameter is different across perpendicular planes, for instance in the case of a vessel which has a rectangular cross-section, the two cross-sectional diameters may for instance be chosen from any value within the aforesaid range given in regard to the cross-sectional diameter. Where the vessel consists of two concentric cylinders, the cross-sectional diameter of the inner cylinder may be at least 0.1 m, for instance at least 0.2 m or at least 0.5 m. The inner cylinder may have a cross-sectional diameter much larger than this provided that it is less than the outer concentric cylinder and allow sufficient volume between the two cylinders to enable the process to be conducted. In general the inner concentric cylinder may have a cross-sectional diameter of up to 4.5 m, for instance up to 4 m or even up to 3.5 m, such as no more than 3 m. Suitably the cross-sectional diameter of the inner cylinder may be between 0.5 m and 2.5 m, for instance between 0.6 m and 2.0 m, such as between 0.7 m and 1.2 m. Desirably the outer concentric cylinder should have a cross-sectional diameter which is up to 3 m greater than the cross-sectional diameter of the inner cylinder, for instance up to 2.5 m or up to 2 m. Often the outer concentric cylinder may have a cross-sectional diameter which is at least 0.05 m greater than that of the inner cylinder, for instance at least 0.1 m greater.

The process and apparatus of the present invention may comprise a single vessel. Nevertheless it may be desirable to employ a multiplicity of vessels connected in parallel. In such cases the number of vessels employed may depend upon the quantity of polymer beads to be prepared simultaneously. For instance, it may be desirable to employ up to 30 vessels or more in parallel. Typically the number of vessels may be up to 20 or 25 vessels, for instance up to 15 vessels. Where a multiplicity of vessels are employed the number of vessels may be at least 2 or more, for instance at least 3 vessels or at least 5 vessels in parallel.

Where a multiplicity of vessels (1) are used in the apparatus of the present invention in may be desirable for the polymer beads discharged from the polymer be discharge point of all or some of the vessels (1) to be directed into a single post-polymerisation vessel. Nevertheless it may be desirable that the polymer beads discharged from the multiplicity of vessels (1) are fed into two or more post-polymerisation vessels connected in parallel.

The vessel may be constructed of at least one corrosion stable material, for instance alloy steels containing nickel, chromium, molybdenum, vanadium, silicon already combinations thereof or glass etc. The vessel may be constructive of a combination of materials, for instance alloy steel with glass sections. In addition the vessel may also be lined with a suitable material such as glass and/or other materials which impart corrosion resistance or antifouling properties.

The photoinitiator may be any photoinitiator suitable for conducting photo polymerisation of ethylenically unsaturated monomers, especially water-soluble ethylenically unsaturated monomers. Suitable initiators for UV polymerisation used in accordance with the present invention include one or more of the compounds selected from the group, 2-Hydroxy-2-methyl-1-phenyl-propan-1-one, 1-[4-(2-Hydroxyethoxy)-phenyl]-2-hydroxy-2-methyl-1-propane-1-one, 50% 1-Hydroxycyclohexyl-phenyl-ketone (IRGACURE 184), 50% Benzophenone, Bis(2,4,6-trimethylbenzoyl)phenylphosphineoxide, 40-70% oxyphenyl-acetic acid 2-[2 oxo-2-phenyl-acetoxy-ethoxy]-ethyl ester, 30-60% oxy-phenyl-acetic 2-[2-hydroxy-ethoxy]-ethyl ester, Phenyl glyoxylic acid methyl ester, Ethyl-2,4,6-Trimethylbenzoylphenylphosphinate, 2,2'-Azobis (N,N'-dimethyleneisobutyramidine)dihydrochloride, 2,2'-Azobis(2-amidinopropane) Dihydrochloride, 2,2'-Azobis{2-[1-(2-hydroxyethyl)-2-imidazolin-2-yl]propane}dihydrochloride, 2,2'-Azobis(1-imino-1-pyrrolidino-2-ethylpropane)dihydrochloride, 2,2'-Azobis[2-methyl-N-(2-hydroxyethyl)propionamide], 4,4'-Azobis(4-cyanovaleric acid), and 2,2'-Azobis (2-methylpropionitrile. Preferred UV initiators include azo compounds, especially those which are water-soluble. A particularly suitable photoinitiator is V50 which is 2,2'-azo bis(2-methyl propionamidine)dihydrochloride.

The initiator system may be present in the non-aqueous liquid and/or aqueous monomer or monomer blend but preferably would be present in the aqueous monomer or monomer blend only. Where a photoinitiator is present in the non-aqueous liquid it may be added at the monomer feed point or alternatively added to the non-aqueous liquid at any stage prior to the monomer feed point provided that the photoinitiator is not exposed to any UV light prior to the monomer feed point. In a preferred form of the invention the photoinitiator is dissolved in the aqueous monomer or monomer blend suitably prior to the extrusion of the monomer through the orifices. Typically where the process involves photo polymerisation, the photoinitiator may be included at the stage where the aqueous monomer or monomer blend is made up or alternatively photoinitiator may be added as the aqueous monomer or monomer blend is flowed towards the orifices.

One advantage of the present process over the prior art, especially over the process of EP 952989 is that the reaction can be started at a relatively ambient temperature or even a cold temperature. For instance the non-aqueous liquid and monomer beads contained therein at the start of the reaction may be at a temperature below 30° C., preferably below 25° C., for instance below 20° C. Usually the temperature is at least −5° C. and usually at least 0° C. The temperature of the aqueous monomer fed or extruded into the non-aqueous liquid may be between −5° C. and 25° C., for instance between 0° C. and 20° C., such as between 5° C. and 15° C. The non-aqueous liquid as it enters the column should desirably have a temperature below 30° C., for instance below 20° C.

In a preferred aspect of the process by starting the process at a cooler temperature of the non-aqueous liquid the reaction may approach completion without the risk of overheating. Suitably by starting the polymerisation at a relatively cooler temperature improved product properties are achieved, such as higher polymer molecular weight and improve linearity (i.e. reduced branching). The process may be conducted adiabatically or isothermally. By adiabatically we mean that the temperature of the reaction medium rises at least by 50° C. and usually at least 60 or 70° C. over the course of the reaction. By isothermally we mean that there is essentially no temperature difference of the reaction medium over the course of the reaction. In some cases the process may be somewhere in between isothermal and adiabatic, for instance a temperature rise of the reaction medium between 0 and below 50° C. over the course of reaction.

Preferably the column of non-aqueous liquid leads downwardly to a polymer bead discharge point at which the beads collect after they have reached the non-coalescent state. For instance, a substantially non-coalescing skin tends to form around each bead or the entire bead will have become non-coalescing. Accordingly, by the time the beads reach the discharge point, it is possible to expose them to turbulence and agitation without significant risk of coalescence between the beads. As mentioned above the rate of flow of the non-aqueous liquid tends to be faster at the polymer bead discharge point than above it, since the vessel and therefore the column of non-aqueous liquid tends to narrow at the polymer bead discharge point. Accordingly the bottom of the column can be dimensioned so as to produce a faster of flow. For instance the rate of flow over the bottom 3 to 20%, usually 3 to 10%, of the total length of the column can be more than at higher points in the column, for instance, this can be at least 1.5 times the rate of flow at higher points, suitably at least twice and in some cases at least four or five times a flow rate at the higher parts of the column. It may be as much as 20 times but usually not more than 10 times the flow rate at higher parts of the column.

The suspension of polymer beads, which are preferably non-coalescent, which is removed from the column at the polymer bead discharge point can be a suspension of fully polymerised beads, in which event the final beads can be recovered from it, but often the beads are subjected to further bead polymerisation conditions in a suitable polymerisation vessel as discussed previously. This may be at the base of the column but can be in any suitable vessel into which the suspension can be transferred. Transfer may be by pumping or by merely dropping into the vessel, for instance through a valve. If full polymerisation is to be achieved in the column, the fall time in the column must be sufficiently long to permit this. Generally the fall time in the column is not more than 30 minutes, and a post-polymerisation stage is then usually desirable. If further polymerisation is required this may be achieved by maintaining the same polymerisation conditions after removal of the suspension from the column. Alternatively the polymerisation conditions applied after the suspension has passed through the polymer bead discharge point may be different from the polymerisation conditions employed in the column.

The post polymerisation conditions to which the beads are exposed in the post polymerisation stage (after discharge from the vessel) can be conventional conditions in which the suspension of beads in non-aqueous liquid is subjected to agitation in conventional manner so as to keep the beads in suspension in the non-aqueous liquid. The post polymerisation may be carried out in any suitable post polymerisation vessel. It may be desirable for such a post polymerisation vessel to be the same as the vessel employed in the main polymerisation reaction. For instance the polymer beads may be fed into the post polymerisation vessel and allowed to flow, either in an upwards or a downwards direction, through the non-aqueous liquid towards a bead discharge point. In this case the post polymerisation vessel would not be agitated or stirred. Alternatively it may be desirable for such a post polymerisation vessel to contain internal baffles or static mixers.

Preferably, the post polymerisation vessel may be at least one continuous stirred tank reactor (CSTR). One type of CSTR which may be employed is described in WO 02/49756 in which the polymer beads dispersed in the non-aqueous liquid may enter a column through an inlet tangentially in which the column contains a central rotating element wherein the dispersion of polymer beads is subjected to post polymerisation conditions before being fed through an outlet tangentially. Alternatively, other types of CSTRs, for instance containing central stirrers or impellers, may be employed as the post polymerisation vessel in which a dispersion of the polymer beads is injected through one end of the CSTR and subjected to post polymerisation conditions before being fed out of the vessel through a polymer bead discharge point. It may be possible to use a cascade of such CSTRs connected in series, for instance at least 2 or at least 3 and possibly up to 10 or up to 15 or more.

One particularly suitable type of post polymerisation vessel includes a CSTR which may be equipped with turbine agitators and heating jackets. Suitably the internal temperature may be for instance between 70 and 90° C. in combination with an internal pressure of between 50 and 300 mb, for instance between 50 and 200 mb. Where a cascade of CSTRs connected in series are employed, the transfer between each CSTR may be done by overflow pipes. Within such one or more CSTRs some of the water contained within the polymer beads and optionally a portion of some of the continuous phase liquid may be distilled off.

In general the removal of water from the polymer beads in the post polymerisation vessel desirably should achieve polymer beads that contain less than 20% residual water, for instance between 5 and 15% residual water. It may be desirable to remove further residual water from the polymer beads using other techniques such as evaporation. Preferably the residual water is removed by evaporation using at least one fluid bed dryer.

The overall polymerisation conditions are generally such that the total period between introducing the monomer into the non-aqueous liquid and completion of polymerisation is between about 30 min and 3 hours, more usually between about 60 min and 1.5 or 2 hours and usually under elevated temperatures.

The process can be conducted in a batch type process but preferably the process is substantially continuously with the result that there is a substantially uniform residence time in the process for all the material which is being polymerised.

Nevertheless in some cases it may be desirable to carry out the process batchwise, wherein during each batch there is continuous addition of monomer until all the monomer has been added, there is continuous flow of non-aqueous liquid until all the beads have fallen through it, and the final polymerisation is conducted for sufficient time to ensure that full polymerisation has occurred of the beads which were introduced last. Preferably, the separation of the polymer beads is done under ambient conditions By ambient conditions we mean at a temperature of between 15 and 30° C., for instance between 15 and 25° C.

The non-aqueous liquid usually needs to be purged with nitrogen before entering the vessel and conveniently this is conducted during the introduction or recycling of the non-aqueous liquid to the column. Where the flow is upwards the non-aqueous liquid would be returned to the base of the column and where the flow is downwards the non-aqueous liquid would be returned to the top of the column.

The recovery of polymer beads from the polymerisation suspension typically involves separating the beads from the non-aqueous liquid. Preferably such recovery also involves removing the water before separating the polymer beads from the non-aqueous liquid. Preferably it also involves removing unreacted monomer.

Preferably the polymer beads in non-aqueous liquid is subjected to distillation optionally under reduced pressure (i.e., distillation which removes both water, volatile unreacted monomer and non-aqueous liquid). After distillation to reduce the water content to, for instance, below 10% by weight of the beads, they may then be separated from the residual non-aqueous liquid by filtration or centrifugation and may then be subjected to further drying, for instance fluid bed drying.

The process of the present invention enables a greater quantity of polymer beads to be manufactured than capable in the process of EP 952989. In fact, the process of the present invention enables a significantly higher concentration of polymer beads to be manufactured simultaneously. Suitably, the suspension of the non-coalescent polymer beads in the non-aqueous liquid removed at the polymer bead discharge point should have a concentration of at least 10% polymer beads on total weight of suspension. Desirably the concentration may be at least 30%, 35% or even at least 40%. In some cases the concentration may be as high as 50%

The process of the present invention may enable the polymer beads to be produced at a rate of at least 15 kg/hour, preferably at a rate of at least 20 kg/h. This may be as high as 1 or 2 tonnes/h, or even as high as 5 or 10 tonnes/h and for instance as high as 50 tonnes/h or more.

The monomers which can be used for making the polymers of the invention can be any of those conventionally used for the production of water soluble or superabsorbent polymer beads from ethylenically unsaturated material. The monomers are usually preferably ethylenically unsaturated monomers and frequently acrylic monomers or vinylformamide.

The ethylenically unsaturated monomers can be water-soluble or water-insoluble ethylenically unsaturated monomers. The ethylenically unsaturated monomers may be obtained by a chemically catalysed process, a biologically catalysed process or a biological process.

Suitably the monomer or monomer blend may be water-soluble or at least partially hydrophilic or amphiphilic. When the monomer, each monomer or blend of monomers is water-soluble preferably they have a solubility of at least 5 g in 100 mL of water at 25° C.

N-vinylformamide can be polymerised to form polyvinylformamide which can subsequently be partially or wholly hydrolysed to provide a polymer containing vinyl amine units.

Water-soluble ethylenically unsaturated monomers can be carboxylic acids of formula

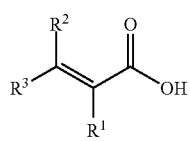

(I)

or salts thereof, in which $R^1$, $R^2$ and $R^3$ are the same or different and are hydrogen, $C_{1-2}$-alkyl, carboxy or $C_{1-2}$-alkyl substituted with carboxy,

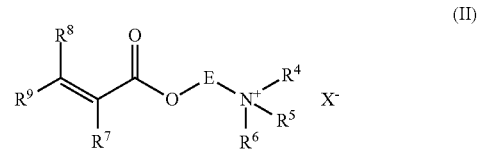

(II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion, amides of formulae

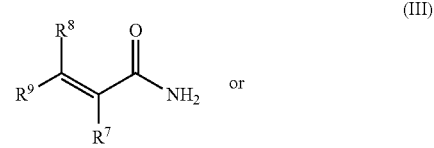

(III)

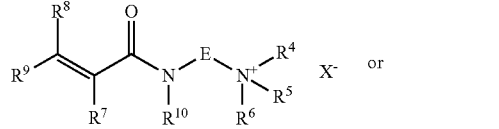

(IV)

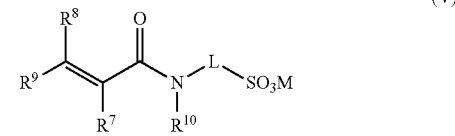

(V)

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation, vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium or alkali metal salts thereof. Examples of alkali metals are sodium and potassium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethylmethacrylate methyl chloride quaternary salt.

Examples of amides of formulae III, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methypropane sulfonic acid.

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble ethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble ethylenically unsaturated monomers are methyl acrylate, ethyl acrylate, butyl acrylate, 2-ethyl hexyl acrylate, stearyl acrylate, methyl methacrylate and stearyl methacrylate.

Preferably the ethylenically unsaturated monomers are water-soluble.

More preferred ethylenically unsaturated monomers are water-soluble and are selected from the group consisting of carboxylic acids of formula

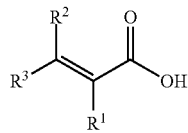
(I)

or salts thereof, in which $R^1$, $R^2$ and $R^3$ are the same or different and are hydrogen or methyl, carboxy or methyl substituted with carboxy,
esters of formula

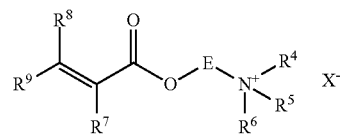
(II)

wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion,
amides of formulae

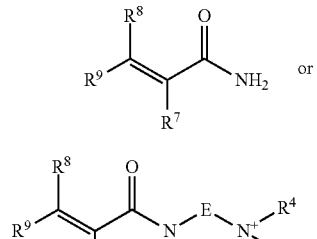
(III)

(IV)

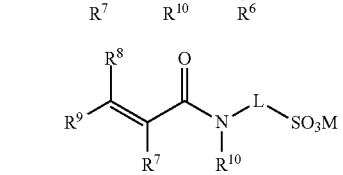
(V)

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation.

Examples of $C_{2-3}$-alkylene are ethylene, trimethylene and propylene. Examples of $C_{1-3}$-alkyl are methyl, ethyl, propyl and isopropyl.

Even more preferred ethylenically unsaturated monomers are water-soluble and are selected from the group consisting of
carboxylic acids of formula

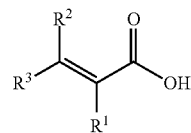
(I)

or salts thereof, in which $R^1$ is hydrogen or methyl and $R^2$ and $R^3$ are both hydrogen,
esters of formula

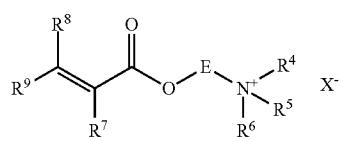
(II)

wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkylsulfate,
amides of formulae

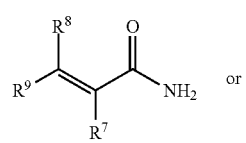
(III)

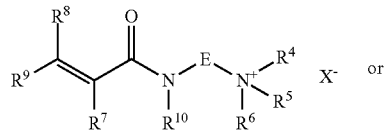
(IV)

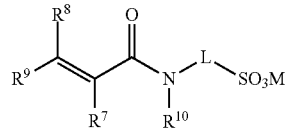
(V)

wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal.

Most preferred ethylenically unsaturated monomers are water-soluble and are selected from the group consisting of acrylic acid or salts thereof, esters of formula

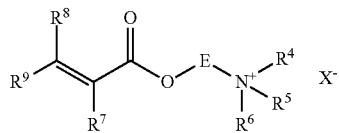
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate,
acrylamide and amides of formula

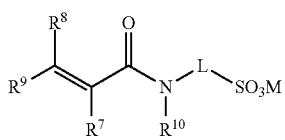
(V)

wherein $R^7$, $R^8$, $R^9$ have the meaning as indicated above, L is $C_{2-4}$-alkylene, $R^{10}$ is hydrogen, and M is hydrogen, ammonium or an alkali metal.

Examples of $C_{2-4}$-alkylene are ethylene, trimethylene, propylene, 2-methylpropylene, tetramethylene and ethylethylene.

Even most preferred the ethylenically unsaturated monomer is water-soluble and is either acrylamide or a mixture of acrylamide with water-soluble ethylenically unsaturated monomer selected from the group consisting of acrylic acid or salts thereof, and esters of formula

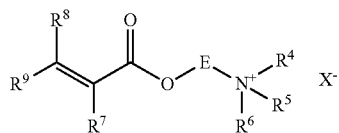
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, and esters of formula

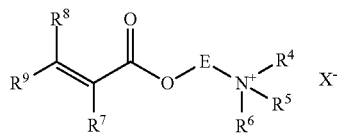
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, is at least 30% by weight based on the weight of the monomer mixture.

When the monomer or mixture of monomers comprises acrylamide, the acrylamide may have been produced by a suitable process, for instance by hydrolysis of acrylonitrile. Typically this may be one of the known chemically catalysed processes using inorganic catalysts such as Raney copper. Preferably however, the acrylamide would have been prepared using a biological or biologically catalysed process. Suitably this may be achieved by contacting acrylonitrile with a nitrile hydratase enzyme, for example as documented in the patents and literature. Superior polyacrylamide products may be obtained by employing the process of the present invention to polymerise acrylamide, optionally in combination with other ethylenically unsaturated monomers, wherein acrylamide has been obtained by a biological process. Such polyacrylamides would exhibit superior properties as flocculants for instance for water treatment (including sewage sludge treatment), mining applications and as retention/drainage aids in the paper industry.

Where the monomer, each monomer or monomer blend contains at least one of amphiphilic monomers and/or partially hydrophilic monomers desirably they may be any such monomers which are known in the literature.

Amphiphilic monomers or partially hydrophilic monomers are defined as monoethylenic unsaturated based monomers which have at least one hydrophilic group and at least one hydrophobic group in its structure. The partial solubility in water can be based on the presence of anion and/or cation and/or other neutral hydrophilic moieties.

They include, for instance, acrylamide-derived cationic monomer (Formula I) or acrylate-derived cationic monomer (Formula II) containing a hydrophobic chain and with the general formula:

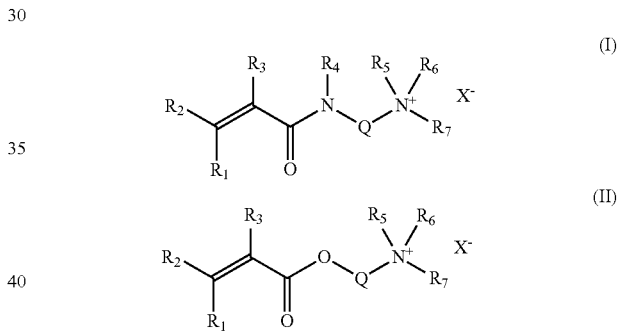

Where:
R1, R2, R3, R4, R5, R6, independently, can be a hydrogen or an alkyl chain containing 1 to 4 carbons
Q: an alkyl chain containing 1 to 8 carbons
R7: an alkyl or alkenyl or arylalkyl chain containing 6 to 30 carbons
X: a halide selected from the group including chloride, bromide, iodide, fluoride or a counterion with a negative charge A preferred structure for formula (I) is when R1=R2=R3=R4=H, which generates an acrylamide moiety. Another preferred structure is obtained when R1=R2=R4 and R3=CH3. Then a methacrylamide derivative is generated.

Similar to formula (I), a preferred structure for formula (II) is when R1=R2=R3=H, which generates an acrylate moiety. Another preferred structure is obtained when R1=R2=H and R3=CH3. Then a methacrylate derivative is generated.

Among all alkyl possibilities for Q, preferably Q is either an ethyl or a propyl group Preferably, R5=R6 and are either methyl or ethyl moieties For the substitute R7, preferred structures are hexyl, octyl, decyl, dodecyl, hexadecyl, octadecyl or benzyl.

Examples of preferred structures for the invention having the formula (I) are N-acrylamidopropyl-N,N,dimethyl-N-dodecyl ammonium chloride, N-methacrylamidopropyl-N,N,dimethyl-N-dodecyl ammonium chloride, N-acrylamidopropyl-N,N,dimethyl-N-dodecyl ammonium bromide, N-methacrylamidopropyl-N,N,dimethyl-N-dodecyl ammonium bromide, N-acrylamidopropyl-N,N,dimethyl-N-octadecyl ammonium chloride, N-methacrylamidopropyl-N,N,dimethyl-N-octadecyl ammonium chloride, N-acrylamidopropyl-N,N,dimethyl-N-octadecyl ammonium bromide, N-methacrylamidopropyl-N,N,dimethyl-N-octadecyl ammonium bromide, N-acrylamidopropyl-N,N,dimethyl-N-benzyl ammonium chloride, N-methacrylamidopropyl-N,N,dimethyl-N-benzyl ammonium chloride, N-acrylamidopropyl-N,N,dimethyl-N-benzyl ammonium bromide, N-methacrylamidopropyl-N,N,dimethyl-N-benzyl ammonium bromide. Examples of preferred structures for the invention having the formula (II) are N,N-dimethylaminoethyl acrylate-N-dodecyl chloride, N,N-dimethylaminoethyl methacrylate-N-dodecyl chloride, N,N-dimethylaminoethyl acrylate-N-dodecyl bromide, N,N-dimethylaminoethyl methacrylate-N-dodecyl bromide, N,N-dimethylaminoethyl acrylate-N-octadecyl chloride, N,N-dimethylaminoethyl methacrylate-N-octadecyl chloride, N,N-dimethylaminoethyl acrylate-N-octadecyl bromide, N,N-dimethylaminoethyl methacrylate-N-octadecyl bromide, N,N-dimethylaminoethyl acrylate-N-benzyl chloride, N,N-dimethylaminoethyl methacrylate-N-benzyl chloride, N,N-dimethylaminoethyl acrylate-N-benzyl bromide, N,N-dimethylaminoethyl methacrylate-N-benzyl bromide Other amphiphilic monomer structures can be based on neutral hydrophilic groups. Their formula among other can be based on acrylate-derivative (Formula III) or allyl-derivative (Formula IV). In this case, the solubility is water is enhanced by the presence of ethylene oxide groups present.

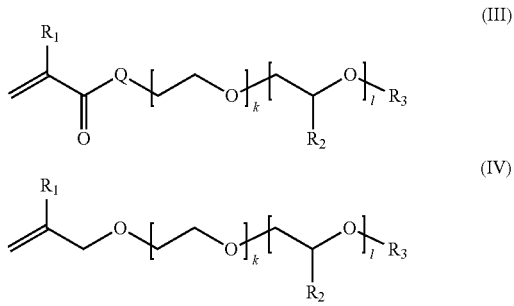

Where:

k and l, are independently two positive real numbers included in the range from 0 to 100, with k+l>3

R1 can be a hydrogen or an alkyl chain containing 1 to 4 carbons

R2 can be an alkyl, alkenyl or arylalkyl chain containing from 1 to 30 carbons

Q can be O or NR4 where R4 is selected from H, alkyl, cycloalkyl, heterocycloalkyl, aryl or hetaryl R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of preferred R2 groups for the formula (II) and (III) are methyl, ethyl, butyl, pentyl, hexyl, dodecyl, hexadecyl, octadecyl or benzyl Examples of R3 groups for the formula (II) and (III) are hydrogen, methyl, ethyl, hexyl, decyl, dodecyl, hexadecyl, octadecyl, benzyl or tristyrylphenyl One preferred substructures family derived for the formula (III) is accessible when the value of l in (III) is equal to zero. Then, a new the amphiphilic monomer based on neutral hydrophilic group can be defined by the Formula (V)

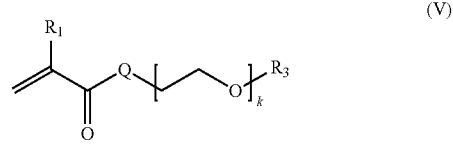

Where:

k is a positive real numbers included in the range from 0 to 100

R1 can be a hydrogen or an alkyl chain containing 1 to 4 carbons

R2 can be an alkyl, alkenyl or arylalkyl chain containing from 1 to 30 carbons

Q can be O or NR4 where R4 can be a hydrogen or an alkyl group containing 1 to 4 carbons R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of R3 groups for the formula (V) are hydrogen, methyl, ethyl, hexyl, decyl, dodecyl, hexadecyl, octadecyl, benzyl or tristyrylphenyl Formula (V) include, among other, commercial products like for example Visiomer® C18 PEG 1105 MA W, Plex® 6877-0 or Lutencryl® 250 which are trade names for a methacrylate derivative based on 016018 fatty alcohol ethoxylated. Sipomer® BEM is another example of commercial product which fulfils the formula (V). It is a methacrylate derivative based on behenyl alcohol ethoxylated. Another preferred example is Sipomer® SEM which is a polyoxyethylene methacrylate ω-tristyrylphenyl monomer.

Other amphiphilic monomer structures based on neutral hydrophilic groups can be described by the formula (V)

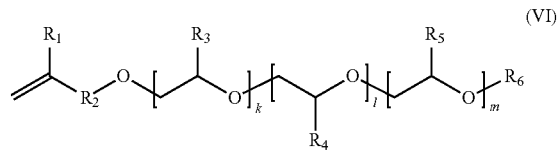

Where:

k and l and m, are independently three positive real numbers included in the range 0 to 100, with k+l+m>3

R1 can be a hydrogen or an alkyl chain containing 1 to 4 carbons

R2 can be either —($C_nH_{2n}$)— or —O—($C_nH_{2n}$)— or —C(O)—O—$C_nH_{2n}$— or —C(O)—$NR_7$—$C_nH_{2n}$— with R7 which can be a hydrogen or an alkyl containing 1 to 4 carbons. In all four different structures of R2, n is a whole number from 1 to 6

R3, R4, R5 are independently either H or an alkyl group containing 1 to 30 carbons or an arylalkyl group containing 6 to 30 carbons. Moreover, to be amphiphilic monomers, molecules based on the formula (VI) need to have at least one of the moieties R3, R4 or R5 equivalent to H. In this case, [CH2-CH($R_i$)—O]$_x$ is a poly(ethylenoxide) group which is the neutral hydrophilic group of the structure R6 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Examples of preferred R3, R4 or R5 groups for the formula (VI) are hydrogen, methyl, ethyl, butyl, pentyl, hexyl, dodecyl, hexadecyl, octadecyl or benzyl Examples of R6 groups for the formula (VI) are hydrogen, methyl, ethyl, hexyl, decyl, dodecyl, hexadecyl, octadecyl, benzyl or tristyrylphenyl.

Depending on the ethylenically unsaturated monomer or monomer mixture used, the polymers produced by the process of the present invention can be anionic, cationic or non-ionic.

When the beads are to be superabsorbent, the monomers are usually anionic (for instance acrylic acid or salt such as sodium acrylate) or a blend thereof with acrylamide.

When the polymer is to be water soluble, it may be nonionic (for instance polyacrylamide homopolymer) or anionic or cationic and is often formed from a blend of acrylamide or other water soluble non-ionic monomer with ionic monomer. Desirably water-soluble polymers may have a solubility in water of at least 5 g per 100 mL of water at 25° C.

Water soluble bead polymers are typically used as viscosifiers, coagulants or flocculants, including retention aids for paper making. They can be anionic, cationic or non-ionic.

Typically they have intrinsic viscosity (IV), of at least 4 dl/g although lower IV beads (e.g., IV 1-4 dl/g) of cationic polymers such as poly diallyl dimethyl ammonium chloride (poly DADMAC) can also be made by this process and used as coagulants. The IV will usually always be above about 0.5 dl/g since lower molecular weight polymers tend to be difficult to put into satisfactory dry bead form.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers is measured using a Number 1 suspended level viscometer at 25° C. in 1M buffered salt solution. Intrinsic viscosity values stated are determined according to this method unless otherwise stated.

The weight average molecular weight of the polymer beads should generally be at least 1 million, for instance at least 2 million and often at least 3 million, preferably at least 5 million. In some cases the weight average molecular weight may be at least 7 million and sometimes at least 10 million. The weight average molecular weight may be as high as 18 or 20 million, for instance as high as 25 million or even as high as 30 million or higher. The molecular weight can be determined for example by static light scattering, small angle neutron scattering, x-ray scattering or sedimentation velocity.

Gel permeation chromatography beads may be formed of acrylamide or blends of acrylamide with other monomers and sufficient polyethylenic cross linker to restrict their swelling in water to 0.2 to 2 times their weight, e.g., 15 to 30%.

The distribution of sizes of polymer beads can, in the invention, be controlled primarily by the distribution of sizes of the extrusion orifices and the extrusion conditions. If (as is usual) all the orifices have substantially the same size then it is possible in the invention to obtain beads which are substantially all of the same size. Accordingly the invention is useful both where a narrow size range is desirable (e.g., as flocculant or viscosifier) and where it is essential for optimum performance (e.g., in a slow release composition).

According to a further aspect of the invention we provide novel beads of water soluble or water swellable polymeric material. These beads are obtainable by the process of the invention or employing the apparatus of the invention.

The invention also provides novel water-soluble or water swellable polymer beads having a mean particle size in the range 0.05 to 5 mm, in which the beads are held in a container containing at least 300 kg and having a standard deviation of particle size less than 20%, preferably below 10%. Suitably the container may be a single storage hopper, a single container used for transportation of the product. Especially desirably the container may be a holding vessel which contains a plurality of single containers, for instance a transportation vehicle, a boat or a ship.

The present invention allows even larger amounts of the water-soluble or water swellable polymer beads of the very narrow particle size distribution to be produced very conveniently and packaged. Thus beads held in a container containing at least 500 kg or even up to 1 tonne or more is possible.

Suitably the water-soluble or water swellable polymer beads are formed from a water soluble ethylenically unsaturated monomer or monomer blend. Preferably the polymer beads have a mean particle size in the range of 0.1 to 3 mm, and at least 95% by weight of the beads have a size of at least 50% of the mean particle size. Usually at least 98%, and generally at least 99%, by weight of the particles have a size at least 50% of the mean particle size. In particular, preferred beads of the invention have at least 95%, usually at least 98% and preferably at least 99% by weight of the beads having a size at least 70% and usually at least 80 to 90% of the mean particle size.

These values indicate that the proportion of fines is extremely low and indeed it is usually substantially zero. Consequently, the product of the present invention is generally practically dust free.

Often the beads have 99.9% by weight of the particles with a size above 50% and often above 80% of the mean particle size.

The relative standard deviation is usually below 20% and preferably below 10%. It can be as low as 3% but is usually at least 5%.

The narrow size distribution in the invention is obtainable in the direct product of the described process, and thus it is not necessary to sieve or otherwise fractionate the bead product to obtain this distribution. For instance, the present invention allows polymer be products to be made which are within a narrow range, for instance greater than 99 weight % between 300 and 1000 µm.

Thus in a further aspect of the present invention we provide water-soluble or water swellable polymer beads having a weight mean particle size in the range 0.05 to 5 mm, in which the beads are held in a container containing at least 300 kg having a standard deviation of particle size less than 20%, preferably below 10%.

Furthermore, we have found that such water-soluble or water swellable polymer beads may have very low levels of residual unreacted monomer, for instance acrylamide. Frequently the amount of residual unreacted monomer, for instance acrylamide, may be less than 500 ppm, preferably less than 200 ppm. The amount of residual unreacted monomer, for instance acrylamide, may be as low as 1 ppm or as low as 5 ppm or 10 ppm.

In a still further aspect of the present invention we provide water-soluble or water swellable polymer beads having a weight mean particle size in the range 0.05 to 5 mm having a standard deviation of particle size less than 20%, preferably below 10%, in which the amount of residual unreacted monomer, for instance acrylamide, may be less than 500 ppm, preferably less than 200 ppm. The amount of residual unreacted monomer, for instance acrylamide, may be as low as 1 ppm or as low as 5 ppm or 10 ppm.

In another aspect of the invention the beads are of water soluble polymeric material.

In another aspect of the invention the beads contain an active ingredient distributed substantially uniformly through the polymeric material, which is often a cross linked material.

In some cases it may be desirable to grind the so formed the polymer beads to produce a polymer powder. Grinding equipment which is suitable for grinding polymers into a powder is well known to those skilled in the art. Thus the process according to the present invention may be further modified such that the so formed polymer beads are ground to form a powder.

BRIEF DESCRIPTION OF THE DRAWINGS

Suitable apparatus for carrying out the invention is illustrated diagrammatically in the accompanying drawings.

EXAMPLES

Example 1

Figure 1:
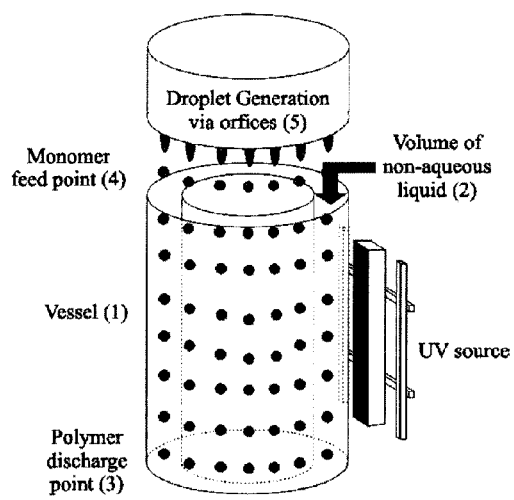
FIG. 1 shows one type of apparatus, consisting of a cylindrical vessel (1) containing to concentric walls. Monomer beads are formed by extrusion of aqueous monomer employing orifices (5) for feeding or extruding monomer. The monomer beads enter the volume of non-aqueous liquid (2) at the monomer feed point (4) and are initiated and irradiated using the UV source and descend as polymerising beads through a volume of non-aqueous liquid between the concentric walls of the vessel. The suspension of polymer beads is removed through the polymer discharge point (3) situated at the base of the vessel.
Figure 2:
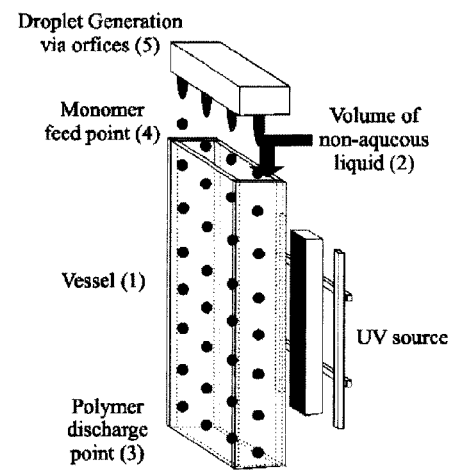
FIG. 2 shows another type of apparatus and differs from the apparatus of FIG. 1 in that the vessel (1) has a rectangular horizontal cross-section.
Figure 3:
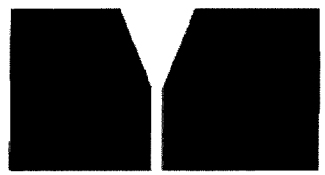
FIG. 3 is a diagrammatic representation of a vertical cross-section of a preferred type of orifice. The upper section of the orifice represents a comical section and the lower section of the orifice represents a cylindrical section.

The preparation of aqueous monomer beads is carried out in vertical vessel (length 10 cm, width 3 cm and height 75 cm) which is filled with Exxsol D40 oil, as a non-aqueous liquid (continuous phase), An aqueous monomer solution is provided as a dispersed phase, said monomer solution containing of a mixture of acrylamide, dimethylaminoethylacrylate methyl chloride quaternary salt (DMAEAMC), water and adipic acid.

| Water | 10.00 kg |
| Acrylamide (50% aqueous solution) | 88.60 kg |
| Adipic Acid | 3.28 kg |
| DMAEAMC (80% aqueous solution) | 77.36 kg |

This calculates as acrylamide 24.7%, dimethylaminoethylacrylate methyl chloride quaternary salt 34.5%, water 38.9% and adipic acid 1.8%

Figure 4:
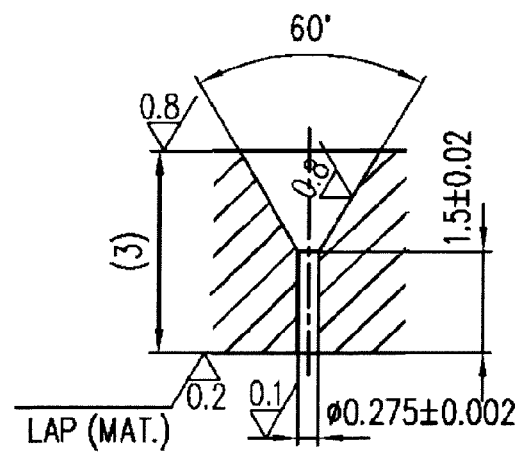
FIG. 4 is an engineering drawing of a vertical cross-section of a preferred type of orifice. The upper section of the orifice is a conical part with a depth of 1.5 mm and a opening angle of 60° and a lower section which is a cylindrical part with a diameter of 0.275 mm (+/−0.002 mm) and a depth of 1.5 mm (+/−0.02 mm).

A plate providing 80 holes comprising a conical part with a depth of 1.5 mm and an opening angle of 60° as well as a cylindrical part with a diameter of 0.275 mm (+/−0.002 mm) and a depth of 1.5 mm (+/−0.02 mm) (shown in FIG. 4) is vibrated and submerged into the Exxsol D40.

The aqueous monomer solution is extruded through the holes of the plate in which it is fed with pump without pulsation and a rate of 40 L/h in which the holes are vibrated at different frequencies as set out in Table 1.

The generated droplets are observed via a high speed camera (model: Basler camera scout scA 1600-28 gm) and analyzed via software, giving the size distribution value Span3. Span3 is a relative standard deviation measurement.

This Span3 value is defined as the percentile x90 (90% of the droplets have their weight average diameter below that size) minus x10 (10% of the droplets have their weight average diameter below that size) divided by x50 (the weight average diameter). The meaning of this value is comparable to the relative standard deviation, which is defined as the standard deviation divided by the average diameter.

TABLE 1

| Frequency [Hz] | X50 (weight average) [mm] | frequency multiplied by the weight average droplet diameter [mm/s] | Span3 |
| --- | --- | --- | --- |
| 0 | 0.71 | — | 31% |
| 20 | 1.00 | 20 (comparative test) | 65% |
| 400 | 0.61 | 244 (inventive test) | 9% |
| 2000 | 0.42 | 840 (comparative test) | 52% |

Example 2

Example 1 is repeated in an analogous experiments except using a nonvibrating plate but with the monomer solution fed through a membrane chamber in which the membrane is vibrating the monomer. This is shown in Table 2.

TABLE 2

| Frequency [Hz] | X50 (weight average) [mm] | frequency multiplied by the weight average droplet diameter [mm/s] | Span3 |
|---|---|---|---|
| 390 | 0.75 | 292 (inventive test) | 14% |

Example 3

Example 1 is repeated except that the Exxsol D 40 contains an amphipathic stabiliser and the monomer solution contains an initiator.

Additionally the column is extended to a height of 12 m and the narrow wall (3 cm) of the column is made from borosilicate glass and equipped with 400 UV-LEDs (each side). The UV LEDs (Nichia NCSU099B, 365 nm) irradiate the mixture inside of the column with about 50 mW/cm$^2$.

The initiator is, 2,2'-Azobis(2-methylpropionamidine)dihydrochloride, is added to the monomer solution to give a concentration of 180 ppm.

The amphipathic stabilizer (0.5 wt-% with respect to dispersed phase; e.g. a copolymer from methyl methacrylate, stearyl methacrylate, acrylic acid and methacrylic acid). The Span3 values for the polymer beads generated are shown in Table 3.

TABLE 3

| Frequency [Hz] | X50 (weight average) [mm] | frequency multiplied by the weight average particle diameter [mm/s] | Span3 |
|---|---|---|---|
| 530 | 0.53 | 281 (inventive test) | 5.1% |
| 530 | 0.49 | 260 (inventive test) | 4.5% |
| 530 | 0.55 | 291 (inventive test) | 5.0% |

The invention claimed is:

1. A reverse-phase suspension polymerisation process for the manufacture of polymer beads comprising forming aqueous monomer beads of an aqueous solution comprising water-soluble ethylenically unsaturated monomer or monomer blend and polymerising the monomer or monomer blend, to form polymer beads while suspended in a non-aqueous liquid, and recovering polymer beads, in which the process comprises:

providing in a vessel a volume of non-aqueous liquid wherein the volume of non-aqueous liquid extends between at least one polymer bead discharge point and at least one monomer feed point, feeding the aqueous monomer or monomer blend through orifices into, or onto, the non-aqueous liquid to form aqueous monomer beads, allowing the aqueous monomer beads to flow towards the polymer bead discharge point initiating polymerisation of the aqueous monomer beads to form polymerising beads, wherein the polymerising beads have formed polymer beads when they reach the polymer bead discharge point, removing a suspension of the polymer beads in non-aqueous liquid from the vessel at the polymer bead discharge point and recovering, water soluble or water swellable polymer beads from the suspension, in which the aqueous monomer or monomer blend and/or the orifices is/are vibrated such that the frequency multiplied by the weight average droplet diameter is between 150 and 800 mm/s, wherein the non-aqueous liquid flows in a downward direction and co-current with the direction of flow of the monomer beads.

2. The process according to claim 1 in which the polymer beads removed from the vessel at the polymer bead discharge point are subjected to a post polymerisation stage.

3. The process according to claim 1 in which the aqueous monomer or monomer blend and/or the orifices is/are vibrated such that the frequency multiplied by the weight average droplet diameter is between 250 and 500 mm/s.

4. The process according to claim 1 in which the vibration amplitude is between 0.0005 and 0.5 mm.

5. The process according to claim 1 in which the orifices are disposed in at least one plate or at least one grid.

6. The process according to claim 1 in which the orifices comprise a conical part and a cylindrical part.

7. The process according to claim 6 in which the aqueous monomer or monomer blend flows through the conical part and then through the cylindrical part.

8. The process according to claim 1 wherein the process is conducted in two or more vessels in parallel.

9. The process according to claim 1 in which the aqueous monomer or monomer blend and/or the non-aqueous liquid contains a polymerisation initiator.

10. The process according to claim 1 in which the suspension of the polymer beads in the non-aqueous liquid removed at the polymer bead discharge point has a concentration of at least 10% polymer beads on total weight of suspension.

11. The process according to claim 1 in which the aqueous polymer beads are produced at a rate of at least 15 kg/hour.

12. The process according to claim 1 in which an amphipathic stabiliser is included in the non-aqueous liquid.

13. The process according to claim 1 wherein the water-soluble ethylenically unsaturated monomer or monomer blend comprises at least one monomer selected from the group consisting of acrylamide, methacrylamide, N-vinyl pyrrolidone, 2-hydroxy ethyl acrylate, acrylic acid (or salts thereof), methacrylic acid (or salts thereof), itaconic acid (or salts thereof), maleic acid (or salts thereof), 2-acrylamido-2-propane sulphonic acid (or salts thereof), vinyl sulphonic acid (or salts thereof), allyl sulphonic acid (or salts thereof), dimethyl amino ethyl acrylate (or acid salts or quaternary ammonium salts thereof), dimethyl amino ethyl methacrylate (or acid salts or quaternary ammonium salts thereof), dimethyl amino propyl acrylamide (or acid salts or quaternary ammonium salts thereof), dimethyl amino propyl methacrylamide (or acid salts or quaternary ammonium salts thereof), vinyl formamide and combinations of any of the above.

14. The process according to claim 13 in which at least one monomer has been prepared by a chemically catalysed process, a biologically catalysed process or a biological process.

15. The process according to claim 13 in which the acrylamide has been prepared by a biological catalysed process or a biological process.

16. The process according to claim 1 in which the so formed polymer beads are ground to produce a polymer powder.

17. The process according to claim 1 in which the process is performed in a continuous mode.

* * * * *

UNITED STATES PATENT AND TRADEMARK OFFICE
CERTIFICATE OF CORRECTION

| | |
|---|---|
| PATENT NO. | : 10,370,461 B2 |
| APPLICATION NO. | : 14/908872 |
| DATED | : August 6, 2019 |
| INVENTOR(S) | : Pascal Hesse et al. |

It is certified that error appears in the above-identified patent and that said Letters Patent is hereby corrected as shown below:

On the Title Page

Page 2, Column 2, Item (56), under OTHER PUBLICATIONS, Line 9, "Polym Er," should read --Polymer,--.

In the Specification

Column 6, Line 46, "beads" should read --beads.--;
    Line 65, "polymerisetion" should read --polymerisation--.

Column 21, Line 27, "the" should read --the,--.

Column 21, Line 27, "50%" should read --50%.--.

Column 22, Line 44, "$C_{1-2}$-Alkyl" should read --$C_{1-2}$-alkyl--.

Column 27, Line 30, "bromide" should read --bromide.--.

Column 28, Line 3, "benzyl" should read --benzyl.--;
    Line 6, "tristyrylphenyl" should read --tristyrylphenyl.--;
    Line 41, "tristyrylphenyl" should read --tristyrylphenyl.--;
    Line 46, "O16O18" should read --C16C18--.

Column 29, Line 20, "benzyl" should read --benzyl.--.

Column 32, Line 12, "(continuous phase)," should read --(continuous phase).--;
    Line 26, "1.8%" should read --1.8%.--.

Signed and Sealed this
Twenty-first Day of January, 2020

Andrei Iancu
*Director of the United States Patent and Trademark Office*